(12) United States Patent  
Liang et al.

(10) Patent No.: US 11,500,205 B2  
(45) Date of Patent: Nov. 15, 2022

(54) WEARABLE AR SYSTEM, AR DISPLAY DEVICE AND ITS PROJECTION SOURCE MODULE

(71) Applicant: Matrixed Reality Technology Co., Ltd., Wuxi (CN)

(72) Inventors: Xiaobin Liang, Beijing (CN); Bing Xiao, Beijing (CN); Chi Xu, Beijing (CN)

(73) Assignee: MATRIXED REALITY TECHNOLOGY Co., LTD., Wuxi (CN)

( * ) Notice: Subject to any disclaimer, the term of this patent is extended or adjusted under 35 U.S.C. 154(b) by 155 days.

(21) Appl. No.: 16/990,633

(22) Filed: Aug. 11, 2020

(65) Prior Publication Data

US 2020/0371371 A1   Nov. 26, 2020

Related U.S. Application Data

(63) Continuation-in-part of application No. PCT/CN2019/074863, filed on Feb. 12, 2019.

(51) Int. Cl.
*G02B 27/01* (2006.01)
*G02B 27/12* (2006.01)
(Continued)

(52) U.S. Cl.
CPC ....... *G02B 27/0172* (2013.01); *G02B 27/017* (2013.01); *G02B 1/11* (2013.01);
(Continued)

(58) Field of Classification Search
CPC .................. G02B 27/0172; G02B 27/017
See application file for complete search history.

(56) References Cited

U.S. PATENT DOCUMENTS 6,215,593 B1   4/2001 Bruce  
7,733,572 B1   6/2010 Brown et al.  
(Continued)

FOREIGN PATENT DOCUMENTS

CN   1664649 A   9/2005  
CN   1743891 A   3/2006  
(Continued)

OTHER PUBLICATIONS

Rudolf Kings Lake, "Lens Design Fundamentals," Academic Press, Inc. 1978, p. 336.
(Continued)

*Primary Examiner* — Bao-Luan Q Le  
(74) *Attorney, Agent, or Firm* — Preti Flaherty Beliveau & Pachios LLP (57) ABSTRACT

The application provides an augmented reality display device comprising a projection source module and an optical path module, the projection source module comprising a projection source (12) and a beam shaping element (14) which are integrated into a unitary piece, and the optical path module comprising a beamsplitter (20) and a reflector (60), wherein virtual image light (VL) emitted from the projection source (12) and carrying virtual image information is emitted out of the projection source module after being shaped by the beam shaping element (14), projected onto the beamsplitter (20) first, then reflected onto the reflector (60) by the beamsplitter (20), then reflected by the reflector (60), and enters a human eye (E) eventually, and scene light (AL) carrying real scene information enters the reflector (60) from an outside of the reflector (60), and is transmitted through the reflector (60) and the beamsplitter (20) into the human eye (E). The application also provides a wearable augmented reality system comprising the augmented reality display (Continued)

device and the projection source module for the augmented reality display device.

17 Claims, 3 Drawing Sheets

(51) Int. Cl.
  *G02B 27/28* (2006.01)
  *G02B 1/11* (2015.01)
  *G02B 27/09* (2006.01)
  *G02B 27/14* (2006.01)

(52) U.S. Cl.
  CPC ...... *G02B 27/0101* (2013.01); *G02B 27/0955* (2013.01); *G02B 27/123* (2013.01); *G02B 27/142* (2013.01); *G02B 27/145* (2013.01); *G02B 27/281* (2013.01); *G02B 27/283* (2013.01); *G02B 27/286* (2013.01); *G02B 2027/013* (2013.01); *G02B 2027/0118* (2013.01); *G02B 2027/0178* (2013.01); *G02B 2027/0185* (2013.01)

(56) References Cited

U.S. PATENT DOCUMENTS

| | | | |
|---|---|---|---|
| 8,094,377 B2* | 1/2012 | Kessler | G02B 27/0172 359/640 |
| 9,971,150 B1* | 5/2018 | Robbins | G02B 26/101 |
| 10,422,995 B2* | 9/2019 | Haddick | G06F 3/011 |
| 11,226,489 B2* | 1/2022 | Haddick | G02B 27/0172 |
| 2003/0169405 A1 | 9/2003 | Agostinelli et al. | |
| 2006/0131492 A1 | 6/2006 | Kobayashi et al. | |
| 2009/0109678 A1 | 4/2009 | Hsu et al. | |
| 2010/0290127 A1* | 11/2010 | Kessler | G02B 27/0172 359/631 |
| 2014/0240843 A1 | 8/2014 | Kollin | |
| 2015/0198807 A1* | 7/2015 | Hirai | G02B 27/0172 345/8 |
| 2015/0301336 A1 | 10/2015 | Denefle et al. | |
| 2015/0378074 A1 | 12/2015 | Kollin et al. | |
| 2016/0139411 A1* | 5/2016 | Kang | G02B 27/0172 359/630 |
| 2016/0320559 A1 | 11/2016 | Richards | |
| 2019/0025589 A1* | 1/2019 | Haddick | G02B 27/0018 |
| 2019/0137764 A1* | 5/2019 | Kang | A61B 3/112 |
| 2020/0103659 A1 | 4/2020 | Ouderkirk et al. | |
| 2020/0348522 A1 | 11/2020 | Xiao et al. | |
| 2020/0348531 A1 | 11/2020 | Popovich et al. | |

FOREIGN PATENT DOCUMENTS

| | | |
|---|---|---|
| CN | 101418927 A | 4/2009 |
| CN | 101702045 A | 5/2010 |
| CN | 101881887 A | 11/2010 |
| CN | 201946235 U | 8/2011 |
| CN | 202008041 U | 10/2011 |
| CN | 102520478 A | 6/2012 |
| CN | 102540465 A | 7/2012 |
| CN | 202382166 U | 8/2012 |
| CN | 202433604 U | 9/2012 |
| CN | 103207426 A | 7/2013 |
| CN | 203277499 U | 11/2013 |
| CN | 103913806 A | 7/2014 |
| CN | 105093556 A | 11/2015 |
| CN | 205539729 U | 8/2016 |
| CN | 106019591 A | 10/2016 |
| CN | 206563849 | 10/2017 |
| CN | 107422480 A | 12/2017 |
| CN | 107422481 A | 12/2017 |
| CN | 107589546 A | 1/2018 |
| CN | 108181709 A | 6/2018 |
| CN | 108319019 A | 7/2018 |
| EP | 1024388 A2 | 8/2000 |
| GB | 1282425 A | 3/1969 |
| JP | 0659217 A | 3/1994 |
| JP | 09304730 A | 11/1997 |
| JP | 10311963 A | 11/1998 |
| JP | 11237584 A | 8/1999 |
| JP | 11308640 A | 11/1999 |
| JP | 11326818 A | 11/1999 |
| JP | 2002122806 A | 4/2002 |
| JP | 2002148559 A | 5/2002 |
| JP | 2005077840 A | 3/2005 |
| JP | 2007156096 A | 6/2007 |
| JP | 2008533517 A | 8/2008 |
| JP | 2010243751 A | 10/2010 |
| JP | 2012508392 A | 4/2012 |
| JP | 2017514168 A | 6/2017 |
| JP | 2017120311 A | 7/2017 |
| KR | 20080044040 A | 5/2008 |
| WO | 2012118573 A1 | 9/2012 |

OTHER PUBLICATIONS

Richard D. Hudson, Jr., "Infrared System Engineering," J. Wiley & Sons, Inc., p. 117.

Zhang et al, "Principles and Techniques of Optoelectronics" Published by Beijing University of Aeronautics and Astronautics Press in 2009.

Xu et al., "Colorful Function Film" Published by Gansu Science & Technology Press in 2012.

* cited by examiner

WEARABLE AR SYSTEM, AR DISPLAY DEVICE AND ITS PROJECTION SOURCE MODULE

STATEMENT REGARDING FEDERALLY SPONSORED RESEARCH OR DEVELOPMENT

N/A

TECHNICAL FIELD

The present application relates to the field of Augmented Reality (AR) technology. In particular, the present application relates to a wearable AR system, an AR display device, and a projection source module for the AR display device.

BACKGROUND OF THE INVENTION

Augmented Reality (AR) technology is a technology that combines and presents a virtual image and a real scene in real time. A basic optical principle of the augmented reality technology is to simultaneously project light with real scene information and light with virtual image information into a human eye, so that the information conveyed on the light of the two optical paths is merged in the human eye and a combined image comprised of the real scene and the virtual image is observed by the human eye, achieving an effect of augmented reality.

See-through display devices are key devices in augmented reality systems. Depending on different real scenes, the see-through display devices are classified into video see-through display devices and optical see-through display devices. Common augmented reality glasses or helmets (also known as AR glasses or AR helmets) are examples of the optical see-through AR display devices.

Figure 1:
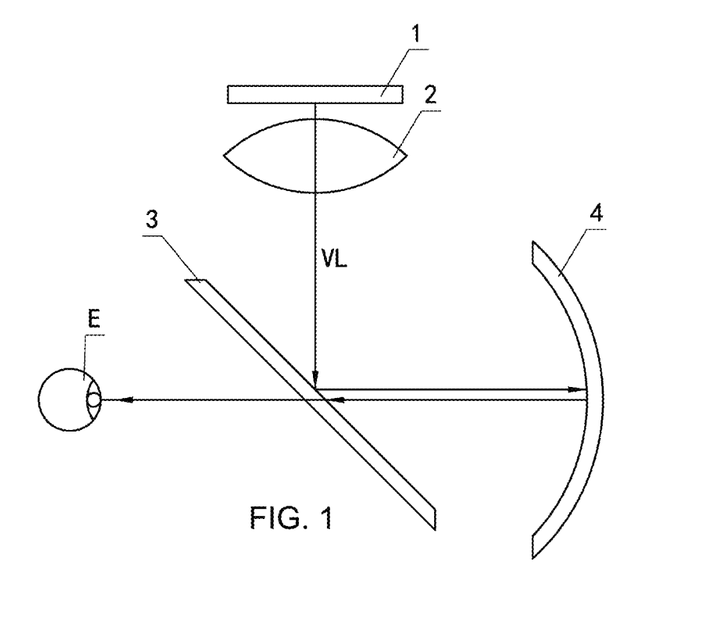
FIG. 1 shows an embodiment of an AR display device in prior art.

FIG. 1 is an optical schematic diagram of an existing AR display device, which generally comprises a projection source module and an optical path module. The projection source module comprises a projection source 1 and a lens 2 serving as a beam shaping element, and the optical path module comprises a beamsplitter 3 and a curved reflector 4.

The principle that a virtual image can be observed by a human eye is as follows: virtual image light emitted from the projection source 1 is incident into the lens 2 and transmitted through the lens 2, and then exits the lens 2, achieving shaping of the light. The shaped light VL is incident on the beamsplitter 3, and at a beamsplitting side of the beamsplitter 3, a portion of the light is reflected onto a reflecting surface of the reflector 4 (while a portion of the light being transmitted through the beamsplitter 3 and disappearing in an external environment), and reflected by the reflector 4 back onto the beamsplitter 3 again. After being transmitted through the beamsplitter 3, the virtual image light VL enters the human eye E eventually.

In this optical configuration, the projection source 1 and the lens 2 are separated by air. Due to a low refractive index of the air, a numerical aperture is difficult to increase, and a limit resolution of a system is limited. Due to a large refractive index difference at an interface of the lens 2 with the air, i.e. at an incident surface of the light, relatively more light is reflected at the interface, generating more stray light and resulting in serious ghost phenomenon. Meanwhile, the projection source 1 and the lens 2 are discrete and separate components, and thus the optical structure is large in size, difficult to assemble and adjust, and easily damaged.

SUMMARY OF THE INVENTION

An object of the present application is to solve at least one of the above drawbacks, to provide a novel projection source module in which a gap between a projection source and a beam shaping element is eliminated, and to provide an AR display device comprising the novel projection source module as well as a wearable AR system comprising the AR display device.

Specifically, according to one aspect, an augmented reality display device is provided which comprises a projection source module and an optical path module, the projection source module comprising a projection source and a beam shaping element which are integrated into a unitary piece, and the optical path module comprising a beamsplitter and a reflector, wherein virtual image light emitted from the projection source and carrying virtual image information is emitted out of the projection source module after being shaped by the beam shaping element, projected onto the beamsplitter first, then reflected onto the reflector by the beamsplitter, then reflected by the reflector, and enters a human eye eventually, and scene light carrying real scene information enters the reflector from an outside of the reflector, and is transmitted through the reflector and the beamsplitter into the human eye. The fact that the projection source and the beam shaping element of the projection source module are closely bonded reduces a refractive index difference at an interface of a lens forming the beam shaping element, improves a transmittance of rim light, reduces ghost images, and enhances brightness of an image.

In a feasible embodiment, the beam shaping element is integrated directly to the projection source, and for example, the beam shaping element is adhesively bonded to the projection source in a face-fitting manner. In cases that the projection source and the beam shaping element have complementary contact surfaces that can be face-fitted to each other, they can be directly bonded and integrated together. The above object is achieved, and the number of components is minimized and the formed structure is simpler and more compact.

In a feasible embodiment, the beam shaping element is integrated indirectly to the projection source via an intermediate matching member. In cases that the projection source and the beam shaping element don't have complementary contact surfaces that can be face-fitted, the intermediate matching member can be used for integrating the two components into the unitary piece.

In a feasible embodiment, the intermediate matching member is formed from at least one medium selected from a group consisting of a liquid medium, a liquid crystal medium, a semi-medium, and a solid medium. For example, the intermediate matching member is formed from at least one medium selected from a group consisting of water, alcohol, glass, and resin.

In a feasible embodiment, the intermediate matching member is formed from a liquid medium and/or a liquid crystal medium, and the projection source module further comprises a sealing structure for sealing a medium forming the intermediate matching member between the projection source and the beam shaping element.

In a feasible embodiment, the intermediate matching member has a medium refractive index of 1 to 2.7.

In a feasible embodiment, the beam shaping element is configured as a positive lens, or is configured as a negative lens, or is configured as a combination of a positive lens and a negative lens.

In a feasible embodiment, the beamsplitter is a planar beamsplitter and has a beamsplitting side on which the virtual image light from the projection source module is incident, and the reflector is a curved reflector and has an optical axis.

In a feasible embodiment, the virtual image light reflected from the beamsplitting side of the beamsplitter is directly projected onto a reflecting surface of the reflector, reflected by the reflecting surface of the reflector directly back onto the beamsplitter, and then transmitted through the beamsplitter.

In a feasible embodiment, the beamsplitter is a polarizing beamsplitter, and the augmented reality display device further comprises a wave plate subassembly provided between the polarizing beamsplitter and the curved reflector, wherein the virtual image light reflected from the beamsplitting side of the beamsplitter is transmitted through the wave plate subassembly and then projected onto a reflecting surface of the reflector, transmitted through the wave plate subassembly again after being reflected by the reflecting surface of the reflector, and then incident onto and transmitted through the beamsplitter.

In a feasible embodiment, the polarizing beamsplitter comprises a polarizing film and a polarizing beamsplitting film, wherein the polarizing film and the polarizing beamsplitting film are arranged so that the virtual image light from the projection source module is incident on the polarizing beamsplitting film first and then incident on the polarizing film, preferably, the polarizing beamsplitting film defines the beamsplitting side; or the polarizing beamsplitter further comprises a substrate and the polarizing beamsplitting film defines the beamsplitting side.

In a feasible embodiment, the wave plate subassembly is a quarter-wave plate, and preferably the quarter-wave plate is bonded to the reflecting surface of the reflector.

In a feasible embodiment, the beamsplitting side of the beamsplitter and the optical axis of the reflector define a first angle therebetween, and a normal line of the projection source of the projection source module and the beamsplitting side of the beamsplitter define a second angle therebetween, wherein a range of the first angle is between the second angle −10° and the second angle +10°, and the first angle is greater than 0° and less than 90°.

In a feasible embodiment, the second angle is between 11° and 79°, preferably between 20° and 70°, more preferably between 30° and 60°, more preferably between 40° and 55°, and most preferably between 40° and 50°.

In a second aspect of the present application, a projection source module is further provided, wherein the projection source module is a projection source module for the above augmented reality display device.

In a third aspect of the present application, a wearable augmented reality system comprising the augmented reality display device is provided, wherein, preferably, the wearable augmented reality system is augmented reality glasses or an augmented reality helmet.

In the projection source module, the augmented reality display device and the wearable augmented reality system, the projection source providing virtual image information and the beam shaping element for shaping the light from the projection source are bonded directly and tightly or integrated into the unitary piece via the intermediate matching member. The virtual image light from the projection source enters the lens forming the beam shaping element without passing through air, as a result of which, the refractive index difference at the interface of the lens is decreased, a light transmittance is improved, a light efficiency is improved, and generation of stray light and ghost images is suppressed. By increasing the refractive index of an image space, a relatively larger numerical aperture can be achieved with a relatively smaller aperture angle, a deflection angle of rim light is decreased, and design is simplified. The application can also provide at least one of the advantages that the formed optical system is more compact, smaller in size, lighter in weight, easy to assemble and adjust, high in system strength, and comfortable to wear.

BRIEF DESCRIPTION OF THE VIEWS OF THE DRAWINGS

The principle of the present application will be described in detail with reference to several embodiments shown in drawings, in order to describe and illustrate the above and other features and advantages of the present application more clearly and thoroughly. It should be understood for those skilled in the art that the embodiments shown in the drawings are only a part of embodiments of the present application given for the purpose of describing and illustrating the principle of the present application, and are not all embodiments of the present application. In order to highlight the principle of the present application, the drawings are not depicted to scale, and only optical diagrams of the present application are shown. In the drawings.

DETAILED DESCRIPTION OF PREFERRED EMBODIMENTS

A wearable AR system according to the present application can be AR glasses or an AR helmet comprising an AR display device according to the present application. The AR display device of the present application generally comprises a projection source module and an optical path module.

The projection source module is configured for providing light carrying virtual image information (hereinafter also referred to as virtual image light VL), and mainly comprises a projection source and a beam shaping element.

According to the present application, the projection source of the projection source module can be any suitable form of projection source. In some embodiments, the projection source can be a monochromatic or polychromatic light source. In some embodiments, the projection source can be a laser source or an LED source, such as an LED display. In some embodiments, the projection source can be a planar projection source such as a flat display screen, or a curved projection source such as a curved display screen. In some embodiments, the projection source can be an integrated light source or a single light source. Illustrative examples of the projection source can include, but not limited to, OLED (Organic Light Emitting Diode), LCOS (Liquid Crystal on Silicon), LCD (Liquid Crystal Display Device), MEMS (Micro Electro Mechanical Display Device), and DMD (Digital Micromirror Device).

The beam shaping element of the projection source module is provided on an outgoing light path of the virtual image light VL emitted from the projection source (herein, a traveling light path of light emitted from an optical device is referred to as an "outgoing light path" of the optical device, and a traveling light path of light incident on an optical device is referred to as an "incident light path" of the optical device), and configured for collimating, shaping and/or combining the light VL emitted from the projection source.

According to the present application, the beam shaping element can be configured as a lens. The lens forming the beam shaping element of the present application can be a single lens or a lens group consisting of a plurality of lenses. The lens or each lens in the lens group can be a positive lens, a negative lens, or any combination of a positive lens and a negative lens, etc., and the lens can be a spherical lens, an aspheric lens, a freeform lens, or the like.

According to the principle of the present application, the beam shaping element can be integrated to the projection source via a direct face-fitting such as adhesive bonding, or can be integrated to the projection source via an intermediate matching member. In other words, the projection source and the beam shaping element of the projection source module of the AR display device according to the present application are integrated into a unitary piece directly or indirectly via the intermediate matching member. The intermediate matching member is made from a matching medium that is different from air and has a refractive index greater than 1. In this way, the light VL emitted from the projection source and carrying the virtual image information enters the beam shaping element without passing through the air or enters the beam shaping element via the matching medium which has the refractive index greater than 1, and then is emitted out of the projection source module via the beam shaping element.

Preferably, the matching medium from which the intermediate matching member is made may have a refractive index of 1 to 2.7. The matching medium from which the intermediate matching member is made can be a liquid medium, a liquid crystal medium, a semi-solid medium or a solid medium, and the intermediate matching member can be formed from at least one of the above-mentioned mediums. The liquid medium can be a transparent medium such as water or alcohol. The solid medium can be a transparent solid medium such as glass. The matching medium can include solid resin and/or semi-solid resin and/or liquid resin.

Figure 2:
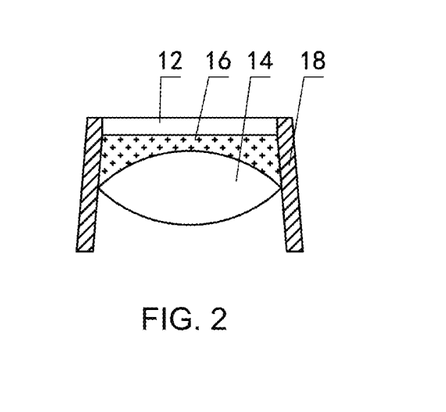
FIG. 2 shows a first embodiment of a projection source module of an AR display device according to the present application.

FIG. 2 shows a first embodiment of a projection source module of an AR display device according to the present application. In this embodiment, a projection source 12 and a beam shaping element 14 are integrated together indirectly via an intermediate matching member 16. In this embodiment, the beam shaping element 14 is provided as a lens, the intermediate matching member 16 is formed from a liquid medium and/or a liquid crystal medium, and accordingly, the projection source module comprises a sealing structure for sealing the liquid medium or the liquid crystal medium between the projection source 12 and the beam shaping element 14. The sealing structure can be any suitable sealing structure in the art.

In a feasible embodiment, the sealing structure comprises a sealing frame 18, the sealing frame 18 being sealed to the projection source 12 by adhesive bonding and the sealing frame 18 being sealed to the lens forming the beam shaping element 14 by an embedding engagement. Alternatively, depending on a state of the medium forming the intermediate matching member 16, adhesive bonding is also applied between the sealing frame 18 and the lens forming the beam shaping element 14.

With this configuration, light emitted from the projection source 12 and carrying a virtual image enters the intermediate matching member 16 first and then enters the beam shaping element 14 in the form of the lens. Due to a refractive index of the matching medium greater than that of air, at an interface of the intermediate matching member 16 and the beam shaping element 14, the refractive index difference between a medium of the lens forming the beam shaping element 14 and the matching medium is less than the refractive index difference between the medium of the lens forming the beam shaping element 14 and the air, which causes more light to be refracted, an improved light transmittance, and an improved light efficiency of the projection source module. Correspondingly, the light reflected at the interface is reduced, which suppresses or reduces generation of stray light and ghost images.

It can be known, from a formula $R=(0.61*\lambda)/(n*\sin\theta)$ (where R is the radius of an airy disc, $\lambda$ is the wavelength of light, n is the refractive index of an image space, and $\theta$ is the incident aperture angle), that the increased refractive index of the matching medium causes a reduced airy disc to be generated and an improved imaging resolution. Further, due to the increased refractive index of an image space, a relatively larger numerical aperture can be achieved with a relatively smaller aperture angle, a deflection angle of rim light is decreased, and the design is simplified. Furthermore, the projection source and the beam shaping element are integrated together, which makes the optical configuration more compact, more easily assembled and adjusted, and more systemic.

Figure 3:
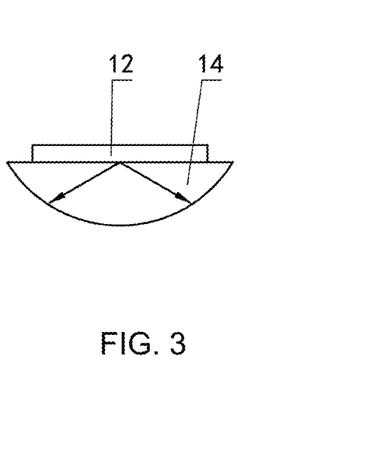
FIG. 3 shows a second embodiment of a projection source module of an AR display device according to the present application.

FIG. 3 shows a second embodiment of a projection source module of an AR display device according to the present application. In the second embodiment, a projection source 12 and a beam shaping element 14 are directly integrated together via face-fitting, the projection source 12 and the beam shaping element 14 comprising complementary contact surfaces which are bonded to each other. As an example, a lens forming the beam shaping element 14 is adhesively bonded to the projection source 12. The projection source 12 can also be tightly bonded to the beam shaping element 14 using any other suitable means known to those skilled in the art.

With this configuration, source light emitted from the projection source 12 enters the lens forming the beam shaping element 14 directly without passing through air. This configuration can provide all the advantages described above with respect to FIG. 2. Moreover, in this configuration, the projection source and the lens are directly bonded to each other, and thus the formed optical structure is more compact, smaller in size, lighter in weight, and comfortable to wear. The compact structure facilitates subassembly and adjustment.

The preferred embodiments of the projection source module according to the present application are described in detail as above with respect to FIGS. 2 and 3. It should be understood for those skilled in the art that the above embodiments are not all embodiments of the projection source module of the present application, and the present application includes all implementations in which the projection source and the beam shaping element are integrated together into a unitary piece. It should also be understood for those skilled in the art that the projection source module of the present application can be used in combination with an optical path module of any composition and any function, and the optical path module used in combination with the projection source module of the present application can comprise any number of optical devices, optical devices of any function, or a combination of optical devices of any arrangement.

An AR display device comprising the projection source module shown in FIG. 2 will be described below with reference to FIG. 4, and the AR display device comprises an optical path module comprising a beamsplitter 20 and a reflector 60. The projection source module has been described as above and will not be described here again.

The beamsplitter 20 of the optical path module is configured as a beamsplitter widely known in the art. The beamsplitter can be a planar beamsplitter or a cubic beamsplitter. In cases that the beamsplitter is a cubic beamsplitter, it is usually formed with two right angled isosceles triangle prisms, bevels of which are bonded to each other to form a beamsplitting side of the beamsplitter. In the embodiments described with reference to the drawings, the beamsplitter is a planar beamsplitter, in which a beamsplitting side of the beamsplitter is parallel to a surface of the beamsplitter on which light is incident. The light incident on the beamsplitting side of the beamsplitter is partially reflected and partially refracted, splitting the light into a reflected light portion and a refracted light portion. A beam splitting film or a polarizing beamsplitting film of the beamsplitter defines the beamsplitting side, and the beam splitting film or the polarizing beamsplitting film comprises an effective portion which can be a one-layer or multiple-layer structure having a thickness of tens of nanometers to hundreds of micrometers. In cases that the polarizing beamsplitting film is used, in addition to the effective portion, it can comprise a base film having a thickness of tens of micrometers to hundreds of micrometers and providing functions of support and protection. In the present specification, although the description is given with regard to the beamsplitting side of the beamsplitter as an example, reflection does not necessarily occur only on the beamsplitting side of the beamsplitter, but can occur within an entire effective thickness of the beam splitting film or the polarizing beamsplitting film of the beamsplitter.

The reflector 60 is configured as a concave reflector which is known in the art. Preferably, the reflector 60 can be a semi-reflector, so that virtual image light VL from the projection source module can enter a human eye E and scene light AL from a real scene can also enter the human eye E. In one embodiment, the reflector can also be a total reflector so that only the virtual image light VL from the projection source module can enter the human eye E. In the context of the present application, unless otherwise stated, the term "reflector" means that the light received by a reflecting surface of the reflector is partially transmitted and partially reflected.

Figure 4:
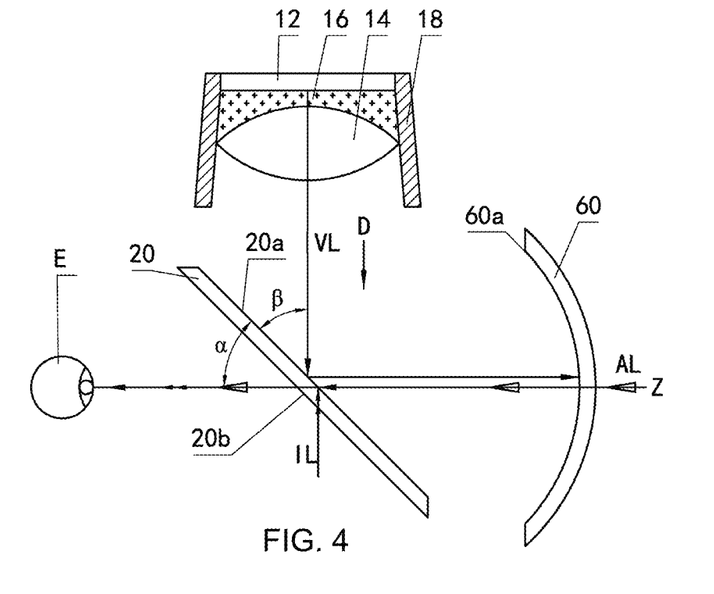
FIG. 4 shows a first embodiment of an AR display device according to the present application.
Figure 5:
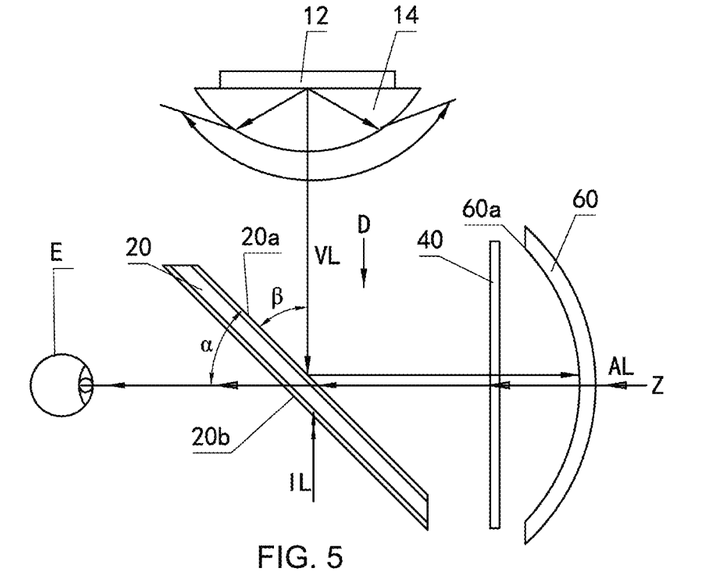
FIG. 5 shows a second embodiment of an AR display device according to the present application.

With the AR display device of FIG. 4, the light VL projected from the projection source module after being shaped and carrying virtual image information is incident on the beamsplitter 20. At a beamsplitting side 20a of the beamsplitter 20, a portion of the light is reflected, and a portion of the light is refracted into the beamsplitter 20 and then exits the beamsplitter 20, disappearing in an external environment. The reflected portion of the light is projected onto the reflector 60, reflected at a reflecting surface 60a of the reflector 60, and then projected onto the beamsplitter 20 again. After that, the light is transmitted through the beamsplitter 20 into the human eye E. In this way, a virtual image from the projection source module can be observed by the human eye E. In FIGS. 4 and 5 of the present application, the virtual image light is indicated by solid arrows.

The scene light AL from the real scene enters the optical path module of the AR display device from an outside of the reflector 60 (a right side of FIG. 4, i.e. the side opposite to the reflecting surface 60a). The scene light AL is transmitted through the reflector 60 first, then incident on and transmitted through the beamsplitter 20, and finally enters the human eye E. In this way, the light VL carrying the virtual image information and the light AL carrying real scene information enter the human eye E simultaneously, and the human eye E simultaneously observes an image of the real scene and the virtual image.

Comprising the projection source module described with respect to FIG. 2, the AR display device shown in FIG. 4 can provide all the technical advantages described above with respect to FIG. 2, including, but not limited to, the formed optical system is compact, small in size, light in weight, easy to assemble and adjust, high in system strength, and comfortable to wear, due to the fact that the projection source and the beam shaping element are provided a tight bonding therebetween with no gap; a relatively larger numerical aperture can be achieved with a relatively smaller aperture angle and a deflection angle of rim light can be decreased, due to the increased refractive index of an image space; and transmittance of the rim light is improved, ghost images are reduced, and image brightness is enhanced due to a decreased refractive index difference at an interface of a lens forming the beam shaping element. Alternatively, the AR display device shown in FIG. 4 can comprise the projection source module as shown in FIG. 3.

However, in the present configuration, there is also interference light IL (indicated by double solid arrows in FIGS. 4 and 5) which is incident on the beamsplitter 20 from a side of the beamsplitter 20 which is opposite to an incident side from which the virtual image light VL is incident on the beamsplitting side 20a. A portion of the interference light IL is transmitted through the beamsplitter 20, and a portion of the interference light IL is reflected into the human eye E, which affects a contrast of an image observed by the human eye E to a certain extent. In order to make improvements on this problem, the present application provides a second embodiment of an AR display device as shown in FIG. 5.

The AR display device shown in FIG. 5 comprises the projection source module of FIG. 3, i.e., the projection source module comprising the projection source 12 and the beam shaping element 14 which are directly integrated together. For details of the projection source module, please refer to the description above with respect to FIG. 3, and detail description will not be given again to avoid redundancy.

Figure 6:
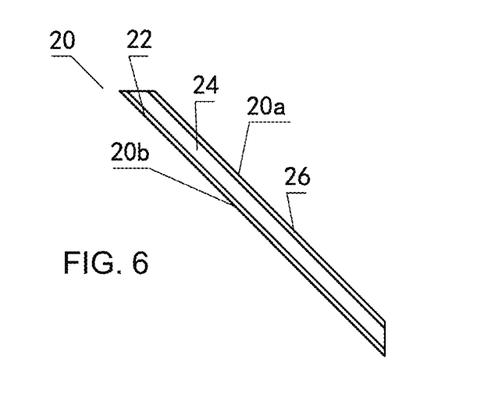
FIG. 6 shows a schematic diagram of a beamsplitter of the AR display device of FIG. 5.

In the present embodiment, an optical path module of the AR display device comprises a beamsplitter 20 which is configured as a multilayer film polarizing beamsplitter, a reflector 60 which is configured as a curved semi-reflector, and a wave plate subassembly 40 provided between the beamsplitter 20 and the reflector 60. As shown in FIG. 6, the multilayer film polarizing beamsplitter forming the beamsplitter 20 can comprise a substrate 22, a polarizing film 24 directly bonded to the substrate 22, and a polarizing beamsplitting film 26 bonded to the polarizing film 24. With this configuration, virtual image light VL from the projection source module is incident onto the polarizing beamsplitting film 26 first and then onto the polarizing film 24. In one embodiment, the substrate of the beamsplitter has a diopter of 0~800°.

The polarizing film 24 is configured to allow a polarized light having a polarization state in a first direction to pass through while absorbing a polarized light having a polarization state in a second direction. The polarizing beamsplitting film 26 is configured to allow the polarized light having the polarization state in the first direction to pass through while reflecting the polarized light having the polarization state in the second direction, the first and second directions being perpendicular to each other. The wave plate subassembly 40 is configured to convert the polarized light in the second direction incident thereon to a circularly polarized light and to convert the circularly polarized light incident thereon to the polarized light in the first direction.

Taken the polarized light in the first direction as P-polarized light and the polarized light in the second direction as S-polarized light as an example, with the AR display device of FIG. 5, the virtual image light VL projected from the projection source module is first incident on the polarizing beamsplitting film 26 of the beamsplitter 20. Due to provision of the polarizing beamsplitting film 26 and the polarizing film 24 of the beamsplitter 20, at a beamsplitting side 20a, most or even all of the S-polarized light in the virtual image light VL is reflected onto the wave plate subassembly 40. Passing through the wave plate subassembly 40, the S-polarized light is converted to circularly polarized light and is incident on a reflecting surface 60a of the reflector 60. The circularly polarized light incident on the reflecting surface 60a is reflected by the reflector 60 and is incident onto the wave plate subassembly 40 again. The circularly polarized light incident onto the wave plate subassembly 40 is converted to the P-polarized light by the wave plate subassembly 40, i.e. the polarized light having the polarization in of the first direction. The converted P-polarized light is incident onto the beamsplitter 20 again, and due to the first polarization direction of the P-polarized light, this light is allowed to be transmitted through the beamsplitter 20 which is formed by the polarizing beamsplitting film 26, the polarizing film 24, and the substrate 22 and enters the human eye, enabling a user to view the virtual image. In one embodiment, the substrate of the beamsplitter has a diopter of 0~800°.

Scene light AL is incident on the reflector 60 from an outside of the reflector 60. Except a portion of the light which is reflected and disappears in an external environment, most of the scene light AL is transmitted sequentially through the reflector 60, the wave plate subassembly 40 and the beamsplitter 20, and enters the human eye E eventually. In this way, the user can view the virtual image and the real external environment simultaneously.

Due to the fact that the beamsplitter 20 comprises the polarizing film 24, interference light IL, when incident on the beamsplitter 20 from a side 20b of the beamsplitter 20 opposite to an incident side of the virtual image light VL, initially arrives at the substrate 22 and the polarizing film 24, where the polarized light in the second direction (S-polarized light) is absorbed and the polarized light in the first direction (P-polarized light) is transmitted. The polarized light in the first direction (the P-polarized light) is then transmitted through the polarizing beamsplitting film 26. As such, substantially all of the interfering light IL is prevented from being reflected into the human eye by the beamsplitter 20, which eliminates interference on the image observed by the human eye E.

It can be understood for those skilled in the art and as described above that the polarized light in the first direction can be the P-polarized light having the polarization state in P-direction, and the polarized light in the second direction can be the S-polarized light having the polarization state in S-direction. Considering that the P-polarized light and the S-polarized light can be rotated around their propagation directions while maintaining the perpendicularity relationship of the polarization directions, in the present application, the polarized light in the first direction can be a polarized light having a polarization direction at a certain angle with regard to the P-direction, the polarized light in the second direction can be a polarized light having a polarization direction at the certain angle with regard to the S-direction, and the polarized light in the first direction and the polarized light in the second direction are not particularly limited.

According to the above principle, the substrate 22, the polarizing film 24, and the polarizing beamsplitting film 26 which form the beamsplitter 20 are configured so that the virtual image light from the projection source module is incident on the polarizing beamsplitting film 26 first and then on the polarizing film 24. Based on this principle, the substrate 22, the polarizing film 24, and the polarizing beamsplitting film 26 of the beamsplitter 20 can have different arrangements from the arrangement shown in FIG. 6 (i.e. along an incident direction D of the light VL: 20a-26-24-22). For example, the polarizing film 24 and the polarizing beamsplitting film 26 can be bonded to opposite sides of the substrate 22, respectively, and the polarizing beamsplitting film 26 defines the beamsplitting side 20a of the beamsplitter 20 on which the virtual image light is incident (i.e. along the incident direction D of the light VL: 20a-26-22-24). Still for example, the substrate 22 and the polarizing film 24 are directly bonded to opposite sides of the polarizing beamsplitting film 26, respectively (i.e. along the incident direction D of the light VL: 22-20a-26-24). In one embodiment, the substrate of the beamsplitter has a diopter of 0~800°.

Further based on the above principle, alternatively, the multilayer film polarizing beamsplitter can exclude the substrate, and only comprises the polarizing film 24 and the polarizing beamsplitting film 26, the polarizing beamsplitting film 26 defining the beamsplitting side 20a of the beamsplitter 20 on which the virtual image light is incident (i.e. along the incident direction D of the light VL: 20a-26-24).

As shown in FIGS. 4 and 5, the beamsplitting side 20a of the beamsplitter 20, the incident direction D along which the virtual image light VL from the projection source module is incident on the beamsplitting side 20a, and the concave reflecting surface 60a and an optical axis Z of the reflector 60 are identified. The beamsplitting side 20a of the beamsplitter 20 and the optical axis Z of the reflector 60 define an angle α therebetween, and the incident direction D of the virtual image light VL and the beamsplitting side 20a of the beamsplitter 20 define an angle β therebetween. A range of the angle α is between from β-10° and β+10°, and α is greater than 0° and less than 90°. In the present specification, the term "between" means endpoints are included. The angle β is between 11° and 79°, preferably between 20° and 70°, more preferably between 30° and 60°, more preferably between 40° and 55°, and most preferably between 40° and 50°. At this point, a field of view of image light is the largest, and a visible range of the image light is the largest.

In the context of this application, a wave plate refers to an optical device which can produce an additional optical path difference between two polarized lights which have polarization directions perpendicular to each other. The wave plate can be a separate device, or a device attached or bonded to another device. It can be understood for those skilled in the art that the wave plate subassembly 40 can be configured as a quarter-wave plate, or other wave plates or retarder films or optical devices which can achieve or substantially achieve functions which can be achieved by the technical solution described in the present application. The quarter-wave plate can have a planar structure or a curved structure. In particular, the quarter-wave plate can have a cylindrical structure; and the quarter-wave plate can have a spherical or aspherical structure.

According to the principle of the present application, the wave plate subassembly 40 configured as the quarter-wave plate can be disposed between the beamsplitter 20 and the reflector 60 as shown, or can be directly bonded to the concave reflecting surface 60a of the reflector 60.

As described above, the polarized lights in the first and second directions can be rotated by 0 to 360° around their propagation directions while maintaining the perpendicularity relationship of the first and second directions, and correspondingly, the polarizing film 24, the polarizing beamsplitting film 26, and the quarter-wave plate forming the wave plate subassembly 40 shall be selected accordingly or be changed regarding to their mounting angles accordingly.

The AR display device shown in FIG. 5 is configured with the optical path module comprising the polarizing beamsplitter and the wave plate subassembly. In addition to the technical advantages that the AR display device shown in FIG. 4 can provide, the AR display device shown in FIG. 5 can also provide the following advantages: an efficiency of light energy utilization is more than doubled, an energy efficiency of image light can be improved to about 25%, brightness of the image light is enhanced, power consumption is saved, and system heat is reduced.

The projection source module and the AR display device including the projection source module of the present application are described in detail as above with reference to the embodiments shown in the accompanying drawings. The projection source module of the present application can have any structure in which the projection source and the beam shaping element are integrated together. The AR display device including the projection source module of the present application can comprises the exemplary optical path modules described with reference to FIGS. 4 and 5, and can further comprises any other type of optical path module.

The above embodiments are merely some implementations that can implement the present application, and not all possible implementations. It should be understood for those skilled in the art that, within the technical scope disclosed in the present application, any modifications and easily conceived changes can be made to the technical solutions disclosed in the above embodiments or any equivalent substitutions can be made to some technical features by those skilled in the art. These modifications, changes and substitutions will not cause corresponding technical solutions to depart from the spirit and scope of the technical solutions disclosed in the above embodiments and should be considered as falling within the protecting scope of the present disclosure. The protecting scope of the present invention shall be determined by the protecting scope of the claims.

What is claimed is:

1. An augmented reality display device comprising:
a projection source module and
an optical path module,
the projection source module comprising a projection source and a beam shaping element which are integrated into a unitary piece, and
the optical path module comprising a beamsplitter and a reflector,
wherein virtual image light emitted from the projection source and carrying virtual image information is emitted out of the projection source module after being shaped by the beam shaping element, projected onto the beamsplitter first, then reflected onto the reflector by the beamsplitter, then reflected by the reflector, and enters a human eye eventually, and wherein scene light carrying real scene information enters the reflector from an outside of the reflector, and is transmitted through the reflector and the beamsplitter into the human eye, wherein the beam shaping element is integrated indirectly to the projection source via an intermediate matching member, a matching medium forming the intermediate matching member has a refractive index greater than a refractive index of air, and a difference between a refractive index of a medium of a lens forming the beam shaping element and the refractive index of the matching medium is less than a difference between the refractive index of the medium of the lens forming the beam shaping element and the refractive index of air.

2. The augmented reality display device of claim 1, wherein the intermediate matching member is formed from at least one medium selected from a group consisting of a liquid medium, a liquid crystal medium, a semi-solid medium, and a solid medium.

3. The augmented reality display device of claim 1, wherein the intermediate matching member is formed from at least one medium selected from a group consisting of water, alcohol, glass, and resin.

4. The augmented reality display device of claim 1, wherein the intermediate matching member has a medium refractive index of 1 to 2.7.

5. The augmented reality display device of claim 1, wherein the beam shaping element is configured as a positive lens, or is configured as a negative lens, or is configured as a combination of a positive lens and a negative lens.

6. The augmented reality display device of claim 1, wherein the beamsplitter is a planar beamsplitter and has a beamsplitting side on which the virtual image light from the projection source module is incident, and the reflector is a curved reflector and has an optical axis.

7. The augmented reality display device of claim 6, wherein the virtual image light reflected from the beamsplitting side of the beamsplitter is directly projected onto a reflecting surface of the reflector, reflected by the reflecting surface of the reflector directly back onto the beamsplitter, and then transmitted through the beamsplitter.

8. The augmented reality display device of claim 6, wherein the beamsplitter is a polarizing beamsplitter, and the augmented reality display device further comprises a wave plate subassembly provided between the polarizing beamsplitter and the curved reflector, wherein the virtual image light reflected from the beamsplitting side of the beamsplitter is transmitted through the wave plate subassembly and then projected onto a reflecting surface of the reflector, transmitted through the wave plate subassembly again after being reflected by the reflecting surface of the reflector, and then incident onto and transmitted through the beamsplitter.

9. The augmented reality display device of claim 8, wherein the polarizing beamsplitter comprises a polarizing film and a polarizing beamsplitting film, wherein the polarizing film and the polarizing beamsplitting film are arranged so that the virtual image light from the projection source module is incident on the polarizing beamsplitting film first and then incident on the polarizing film.

10. The augmented reality display device of claim 9, wherein the polarizing beamsplitting film defines the beamsplitting side; or the polarizing beamsplitter further comprises a substrate and the polarizing beamsplitting film defines the beamsplitting side.

11. The augmented reality display device of claim 8, wherein the wave plate subassembly is a quarter-wave plate.

12. The augmented reality display device of claim 11, wherein the quarter-wave plate is bonded to the reflecting surface of the reflector.

13. The augmented reality display device of claim 6, wherein the beamsplitting side of the beamsplitter and the optical axis of the reflector define a first angle therebetween, and a normal line of the projection source of the projection source module and the beamsplitting side of the beamsplitter define a second angle therebetween, wherein a range of the first angle is between the second angle −10° and the second angle +10°, and the first angle is greater than 0° and less than 90°.

14. The augmented reality display device of claim 13, wherein the second angle is between 11° and 79°.

15. An augmented reality display comprising:
a projection source module and an optical path module,
the projection source module comprising a projection source and a beam shaping element which are integrated into a unitary piece, and
the optical path module comprising a beamsplitter and a reflector,
wherein virtual image light emitted from the projection source and carrying virtual image information is emitted out of the projection source module after being shaped by the beam shaping element, projected onto the beamsplitter first, then reflected onto the reflector by the beamsplitter, then reflected by the reflector, and enters a human eye eventually, and
wherein scene light carrying real scene information enters the reflector from an outside of the reflector, and is transmitted through the reflector and the beamsplitter into the human eye,
wherein the beam shaping element is integrated indirectly to the projection source via an intermediate matching member,
wherein the intermediate matching member is formed from one of a liquid medium and a liquid crystal medium, and the projection source module further comprises a sealing structure for sealing said one of one of the liquid medium and the liquid crystal medium forming the intermediate matching member between the projection source and the beam shaping element, and wherein said one of the liquid medium and the liquid crystal medium forming the intermediate matching member has a refractive index greater than a refractive index of air, and a difference between a refractive index of a medium of a lens forming the beam shaping element and the refractive index of said one of one of the liquid medium and the liquid crystal medium forming the intermediate matching member is less than a difference between the refractive index of the medium of the lens forming the beam shaping element and the refractive index of air.

16. A wearable augmented reality system comprising an augmented reality display device, the augmented reality display device comprising a projection source module and an optical path module,
wherein the projection source module comprises a projection source configured to emit virtual image light carrying virtual image information, a beam shaping element, an intermediate matching member, and a sealing structure configured to seal the intermediate matching member, the projection source and the beam shaping element being integrated together by the intermediate matching member,
wherein the optical path module comprises a beamsplitter and a reflector,
wherein the sealing structure comprises a sealing frame, the sealing frame is sealed to the projection source by adhesive bonding and the sealing frame is sealed to a lens forming the beam shaping element by embedding engagement, and wherein in a cross-section, two ends of the projection source are surrounded by the sealing frame and an entirety of the beam shaping element is located within the sealing frame; and
wherein the beam shaping element is integrated indirectly to the projection source via said intermediate matching member, wherein a matching medium forming the intermediate matching member has a refractive index greater than a refractive index of air, and a difference between a refractive index of a medium of the lens forming the beam shaping element and the refractive index of the matching medium is less than a difference between the refractive index of the medium of the lens forming the beam shaping element and the refractive index of air.

17. The wearable augmented reality system of claim 16, wherein the wearable augmented reality system is augmented reality glasses or an augmented reality helmet.

* * * * *